United States Patent
Burd

(10) Patent No.: US 9,617,720 B2
(45) Date of Patent: *Apr. 11, 2017

(54) COMPACT AIR STOP VALVE FOR AIRCRAFT GALLEY PLUMBING SYSTEM

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

(*) Notice: Subject to any disclaimer, the term of this patent is extended or adjusted under 35 U.S.C. 154(b) by 24 days.

This patent is subject to a terminal disclaimer.

(21) Appl. No.: 15/085,413

(22) Filed: Mar. 30, 2016

(65) Prior Publication Data

US 2016/0208468 A1 Jul. 21, 2016

Related U.S. Application Data

(63) Continuation of application No. 13/901,354, filed on May 23, 2013, now Pat. No. 9,309,656.

(60) Provisional application No. 61/651,740, filed on May 25, 2012.

(51) Int. Cl.
| | |
|---|---|
| *F16K 15/03* | (2006.01) |
| *E03C 1/10* | (2006.01) |
| *F16K 24/00* | (2006.01) |
| *F16K 17/12* | (2006.01) |
| *F16K 27/02* | (2006.01) |

(52) U.S. Cl.
CPC .............. *E03C 1/104* (2013.01); *E03C 1/106* (2013.01); *F16K 15/03* (2013.01); *F16K 17/12* (2013.01); *F16K 24/00* (2013.01); *F16K 27/0209* (2013.01); *Y10T 137/3294* (2015.04)

(58) Field of Classification Search
CPC ........ F16K 15/03; F16K 15/038; E03C 1/106; E03C 1/104; H05K 7/20918
See application file for complete search history.

(56) References Cited

U.S. PATENT DOCUMENTS

| | | | | |
|---|---|---|---|---|
| 201,899 | A * | 4/1878 | Winship ................... | E03F 5/042 137/247.17 |
| 2,630,875 | A * | 3/1953 | Sachs ....................... | E03F 5/042 137/247.15 |
| 6,173,734 | B1 * | 1/2001 | Olivas ...................... | F16K 17/30 137/458 |
| 6,543,474 | B2 * | 4/2003 | Fetterman, Jr. .......... | F16K 15/03 122/14.31 |
| 9,309,656 | B2 * | 4/2016 | Burd ........................ | E03C 1/104 |

* cited by examiner

*Primary Examiner* — Kevin Lee
*Assistant Examiner* — P. Macade Nichols
(74) *Attorney, Agent, or Firm* — Shumaker, Loop & Kendrick, LLP

(57) ABSTRACT

A backflow resistant stop valve for an aircraft galley plumbing system comprises a valve body defining an inlet, and inlet chamber, a transfer chamber, an outlet chamber, and an exit. The valve incorporates an anti-backflow device at the exit to prevent backflow, and flow through the body is controlled by a pivoting paddle disposed within the valve body having an upper flap, a spindle, and a lower flap, where the upper flap seals against the inlet chamber and the lower flap seals against the outlet chamber when the paddle is rotated to a first position. The valve utilizes a negative pressure at the outlet chamber that biases the valve closed until a sufficient column of water overcomes the bias.

10 Claims, 5 Drawing Sheets

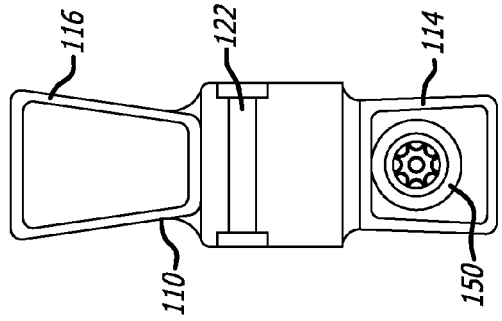
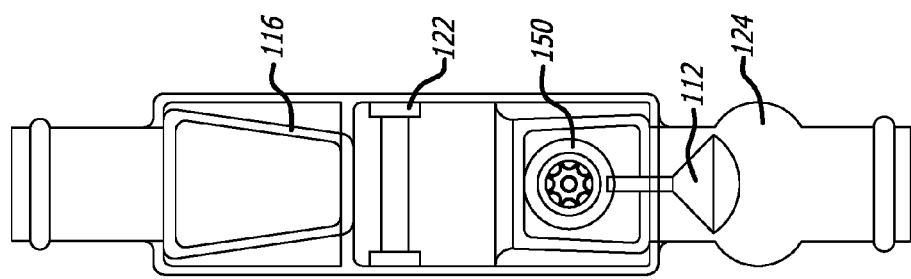
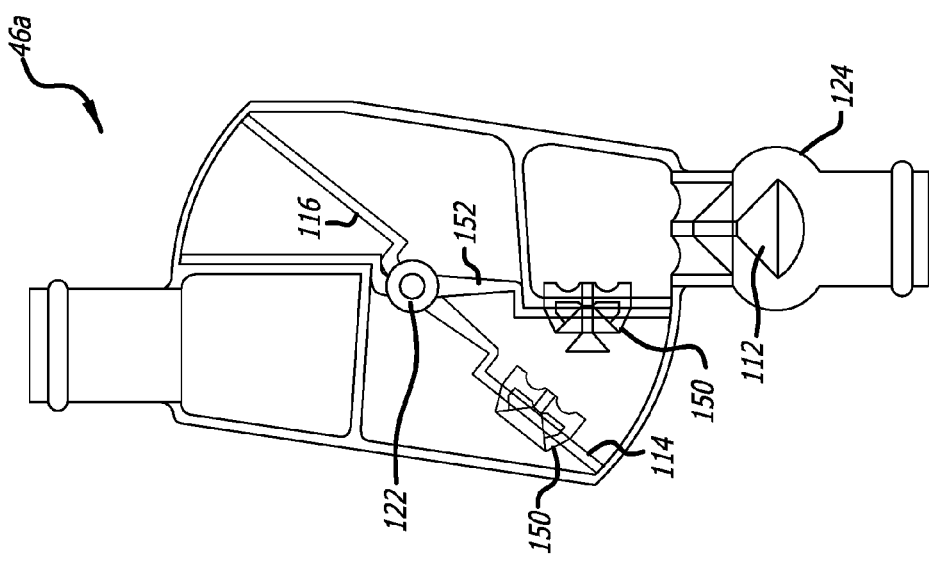

COMPACT AIR STOP VALVE FOR AIRCRAFT GALLEY PLUMBING SYSTEM

CROSS-REFERENCES TO RELATED APPLICATIONS

This is a continuation application based on U.S. application Ser. No. 13/901,354, filed May 23, 2013, which claims priority from U.S. Application No. 61/651,740, filed May 25, 2012, which are incorporated herein by reference in their entirety.

BACKGROUND

One important system on a commercial aircraft is the galley plumbing system. Both potable and waste water must be stored, circulated, and collected on the aircraft via the plumbing system. On a commercial aircraft, potable water is used for multiple applications, including drinking water, beverages such as coffee and tea, and cooking (steam ovens, rice boilers etc.), and as a result must meet certain safety regulated requirements. That is, to ensure that it fit for human consumption, potable water available on an aircraft has to meet certain minimum health and safety standards. This is partially accomplished with aggressive filtering, which also improves the taste and smell, and removes impurities and harmful bacteria. The aircraft plumbing system encompasses all aspects of water usage on a galley, and includes its associated hardware and components as well as the other galley equipment, either consuming or producing water.

To meet the requirements of potable water, galley plumbing systems must pass design requirements specified by the aircraft manufacturers and proving tests to ensure that the potable, waste and foul water systems remain separated and that no cross contamination can occur. Also, when the aircraft shuts down after completion of a flight, or for longer periods of storage or maintenance, all of the systems must be capable of draining completely to evacuate all residual water so as to eliminate all retained water that could potentially become contaminated or breed bacteria. To this end, the plumbing system must be capable of gravitational draining, i.e., receiving air into the system to cause rapid displacement and removal of any trapped water.

It is common practice in the airlines for potable water that has passed through the water filter of the plumbing system to be regarded as waste water. However, recent changes in policy by aircraft manufacturers that are driven by the need to conserve water, has led to requirements that potable water only becomes waste water when it has entered the galley sink. In view of this, it is possible to reclaim potable water by draining all other water fed devices including water boilers, faucets, ovens, filters, etc. into the fresh water tanks. In addition, at the resumption of service, the potable water supply circuit must be capable of being filled automatically without manual assistance, and all sections that may potentially trap air must be capable of self-venting. When filling the potable water circuit, it is important to remember that pressures vary depending on the aircraft and design.

One challenge when designing aircraft plumbing systems on an aircraft is preventing backflow of waste water, which can contaminate the system and foul the drains and venting devices. Moreover, in severe cases foul air from the waste water can rise up and make things unpleasant for the passengers. Accordingly, a reliable and effective stop valve is essential to permit flow through the system, but prevent back flow of waste water.

SUMMARY OF THE INVENTION

The present invention is an air stop valve for an aircraft galley plumbing system. the air stop valve is part of a full potable/waste water/vacuum plumbing system in a reduced footprint, wet/refrigerated galley. Drainage of waste water in the galley plumbing system is controlled by the air stop valve, which also doubles as a back flow prevention device. The air stop valve utilizes the aircrafts applied vacuum downstream of the outlet to drain water into the waste water tank, whereby the vacuum cooperates with the valve to hold the valve closed until the column of water in the hose above the inlet to the stop valve overcomes the vacuum and opens the valve automatically. The vacuum is used to ensure the waste water can be effectively drained into the waste tank. Since the valve is held closed to maintain the vacuum in the system, foul odors from the waste tank are prevented from entering the cabin. The air stop valve also operates to prevent waste water from flowing back up the waste line into the cabin sink.

The valve of the present invention comprises a compact flow control body that reduces exterior dimensions substantially and allowing it to be installed in a confined space. A pivoting paddle within the valve rotates from the open to closed position, sealing the valve to prevent waste water and foul air from passing through the valve. In a preferred embodiment, the paddle has a trapezoidal shape that allows water in certain conditions to bypass the paddle and flow through the valve.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 4a is a first cross sectional view of an alternate embodiment of the air stop valve;

FIG. 4b is a second cross sectional view of the alternate embodiment of the air stop valve;

FIG. 5 is a side view and front view of the paddle of the alternate embodiment;

DETAILED DESCRIPTION OF THE PREFERRED EMBODIMENTS

Figure 1:
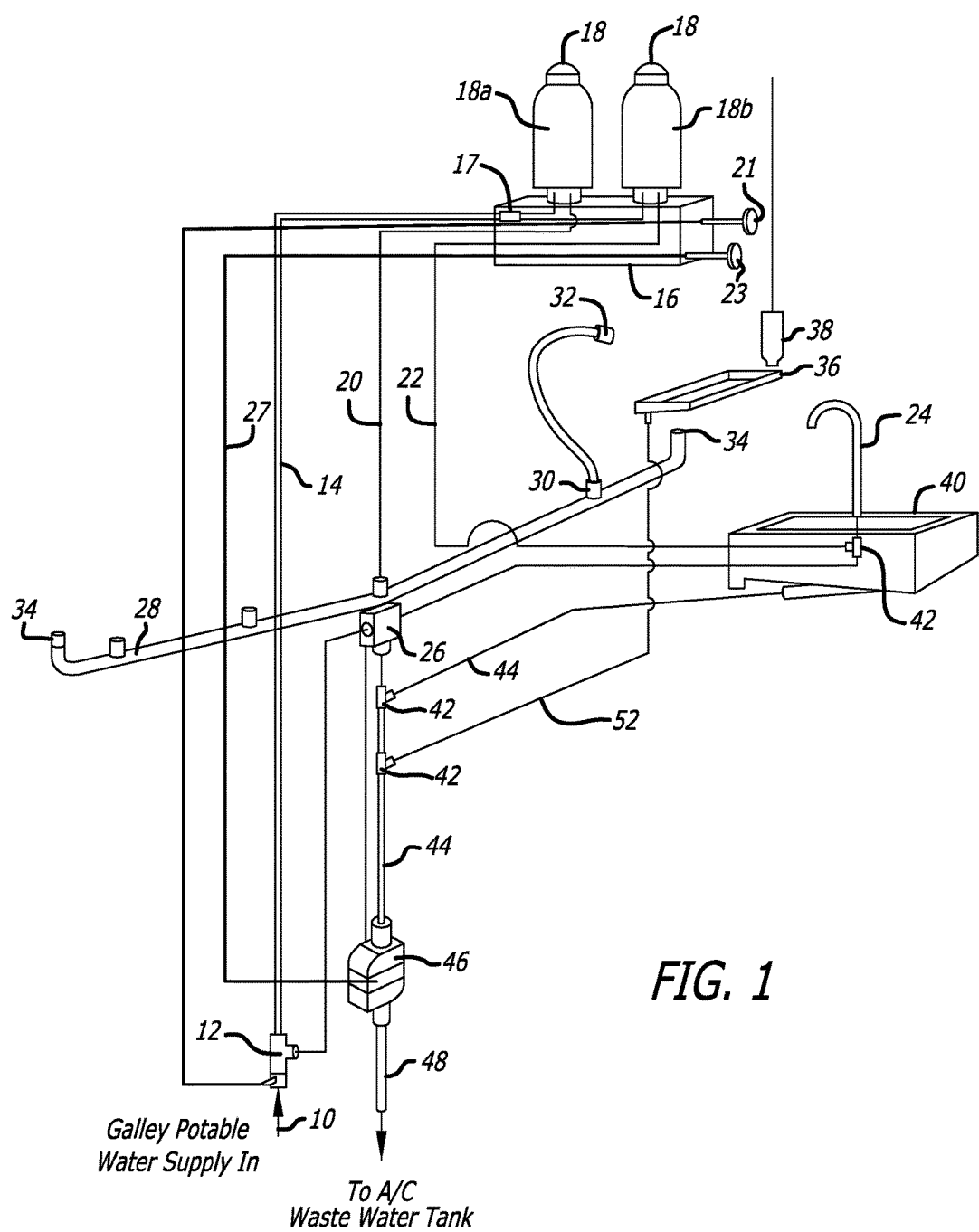
FIG. 1 is a schematic illustration of an exemplary galley utilizing the air stop valve of the present invention.

The plumbing system as shown in FIG. 1 illustrates a schematic diagram for a compact integrated plumbing system designed for use in a reduced foot print refrigerated/wet galley. Water is provided via a bottom fed potable water delivery system where the water supply originates from the bottom of the monument, although similar systems include water fed from above. The invention works well with either system, as well as other plumbing systems. Potable water (indicated by arrow 10) enters the plumbing system via a "T" valve 12 incorporating a remotely operated shut off valve. The main feed 14 supplies the water distribution/filter block 16 through a two way valve 17, where it is filtered using a selected filtration method such as, for example, a spin on type water purification cartridges that incorporate self-venting units 18. Preferably two or more filters 18 are used to reduce back pressure in the system and to allow airlines to select different levels of filtration, a GAINS supply line water filter 18a and a faucet supply line water filter 18b. One line 20 connected to the filter 18a supplies the galley insert equipment (GAINS) such as coffee makers, steam ovens, etc., and the other line 22 from the filter 18b supplies the fresh water faucet 24. The distribution block 16 includes a remote emergency potable water shut off valve 21 and a backflow prevention valve manual override 23 controlled by a cable 27.

The second branch of the Tee valve 12 supplies pressurized water to the compact pressure check valve 26 at a pre-defined pressure. This check valve 26 closes the valve 12 preventing drain down from the GAIN water distribution manifold 28. The distribution manifold 28 supplies potable water via quick disconnect fittings 30. The GAINS are connected to the manifold 28 by flexible hoses 32. The manifold 28 also preferably incorporates self-venting devices 34 to aid the (potable water) filling process, as does the faucet 24. Water from the faucet 24, from GAIN drip trays 36 via condensate drainage catch pots 38, and any condensate from galley air chiller units, is disposed of via drain line 52 to waste line 44 via Tee piece 42. Drainage of waste water entering the sink is accomplished via a Tee piece 42 in the waste water drain line 44 and through a compact, backflow prevention device or Air Stop Valve 46, which operates under a partial vacuum. A manual over ride is remotely connected to the distribution filter block 16. Both the potable drain line 52 and waste water line 44 drain down into the aircraft waste water tank via line 48.

In the foregoing plumbing system, all of the waste water drains downward to the aircraft waste water tank (not shown). Filtered water is distributed from the filter 18a to the GAINS manifold 28 and then to the GAINS via flex hose connections 32. The system is self-venting through various self-venting devices 34, the water filters 18 and faucet 24. All standing water can be quickly vented to prevent contamination of the system and comply with regulation for potable water systems.

Figure 2B:
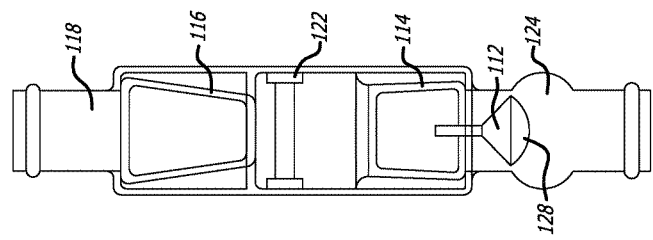
FIG. 2b is a second cross sectional view of the air stop valve of FIG. 1.

FIG. 2 illustrates multiple cross sectional views of a first embodiment of the air stop valve 46 of the present invention. The valve body 102 is divided into three main chambers, the inlet chamber 104, transfer chamber 106, and outlet chamber 108. Within the body 102 is a rotary action paddle 110 that provides a water tight seal, and an anti-backflow device 112 such as a poppet valve 112 or ball valve. In normal operation, the valve 46 is held closed by a vacuum pressure on the downstream side of the system that closes the lower flap 114 of the rotary paddle 110, which is provided by the aircraft drainage system. The rotation of the lower flap 114 against the passageway between the outlet chamber 108 and the transfer chamber 106 also closes the upper flap 116, preventing water from passing through the valve. When the column (head) of water in the drain hose 44 reaches a sufficient pressure, the upper flap 116 of the valve 46 is forced away from its seal to open the drain and water passes through the transfer chamber 106 and out through the outlet chamber 108. Spigots for a standard water drain waste connection are provided at the inlet 118 and outlet 120.

Figure 3:
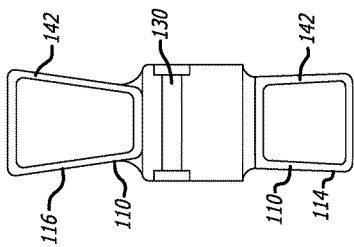
FIG. 3 is a side view and front view of the paddle of the valve.

The upper flap 116 of the paddle 110 is preferably configured in a trapezoidal shape as shown in FIG. 3, which facilitates drainage by allowing water to flow past on either side in the respective chambers once the flap 116 is opened. After the water has drained through the valve 46, the subsequent decrease in hydraulic pressure (head) will allow the vacuum below the valve to re-close the valve. In a preferred embodiment, the pivot point 122 of the paddle mechanism 110 is offset from the flap 116, providing a weighted bias to the lower portion of the paddle that assists in closure. The upper flap 116 is preferably formed with a greater surface area than the lower flap to aid opening under pressure. Both inlet and outlet flaps 116,114 are preferably lined with a durable seal material 142, although this may alternatively or additionally be fitted to the valve body 102.

In the event of a failure of the aircraft vacuum system, waste water will continue to drain through the valve 46 under the action of gravity, although the hydraulic pressure (head) required to open the valve will be greatly reduced. If a backflow surge occurs following the failure of the vacuum system (water is forced up the drain hose from the waste water tank to the valve outlet 120), the valve 46 is fitted with an anti-backflow prevention device in the form of a one way poppet valve 112, shown in the open position in FIG. 2a and in the closed position in FIG. 2b.

Figure 2A:
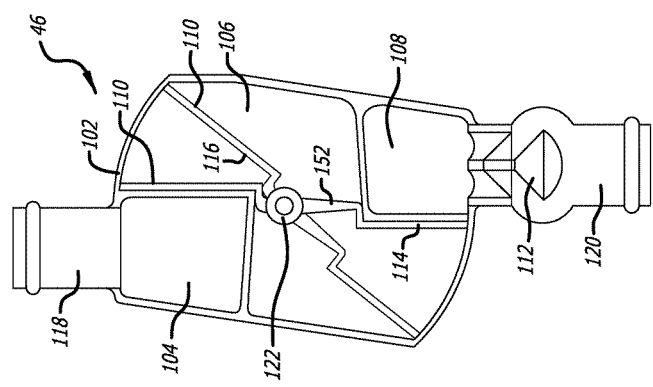
FIG. 2a is a first cross sectional view of the air stop valve of FIG. 1.

Under normal operating conditions, the poppet valve 112 is held open by the aircraft vacuum system as shown in FIG. 2a. In some cases, restriction of the outflow is reduced by incorporating a bell chamber 124 around the poppet head. The valve preferably also incorporates flotation assistance in the form of a light or buoyant material or air filled cap 128 to assist in its effective closure. Oscillation of the valve during drainage also serves to counteract the possibility of seizure due to lack of use.

FIG. 3 illustrates the shape and profile of the paddle 110, including a trapezoidal upper flap 116 and a generally square bottom flap 114. The paddle 110 pivots about a hole 130 that is sized to receive a pin. The hole 130 is offset from both the upper flap 116 and the lower flap 114, and located closer to the upper flap 116 than the lower flap 114 in a preferred embodiment. In this configuration, the paddle 110 can be biased in the closed position which, along with the vacuum, ensures that the valve is closed under ordinary circumstances.

FIGS. 4a and 4b illustrate a variation of the valve 46a with a secondary reverse flow poppet valve 150 fitted to the outlet flap 114 of the paddle 110. The additional poppet 150 assists in preventing the valve from being opened by a waste water backflow in the event of a seizure or failure to seal of the primary backflow prevention device 112. In normal operation, the poppet 150 is held closed by the aircraft vacuum system and drainage functions in the same way as detailed above. In the event of backflow, however, the secondary poppet 150 allows water to enter the outlet side of the transfer chamber 106 at a controlled rate. Due to the position of the pivot point 122 in relation to the outlet flap 114, the waste water will not be capable of exerting the necessary pressure on the lower half of the paddle 114 in order to open valve. In addition, as the center section 152 of the paddle is not water tight, any water reaching the inlet section of the transfer chamber 106 forces the inlet flap 116 against its seal to prevent the water from reaching the inlet chamber 104. Further, with the vacuum restored but the transfer chamber 106 full of waste water, a manual override may be required to allow the automatic drainage to be re-set. FIG. 5 shows the paddle 110a with the secondary anti-backflow device 150 embedded in the lower flap 114. Other anti-backflow devices could also be used as an alternative to the device shown.

Figure 6B:
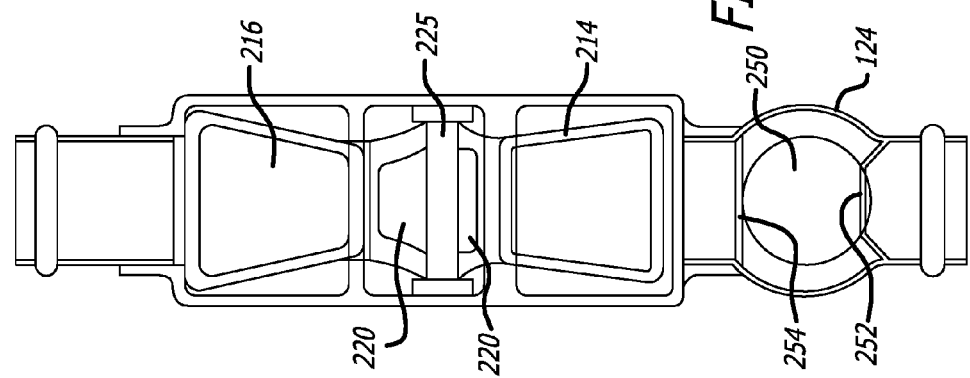
FIG. 6b is a second cross sectional view of the alternate embodiment of FIG. 6.
Figure 6A:
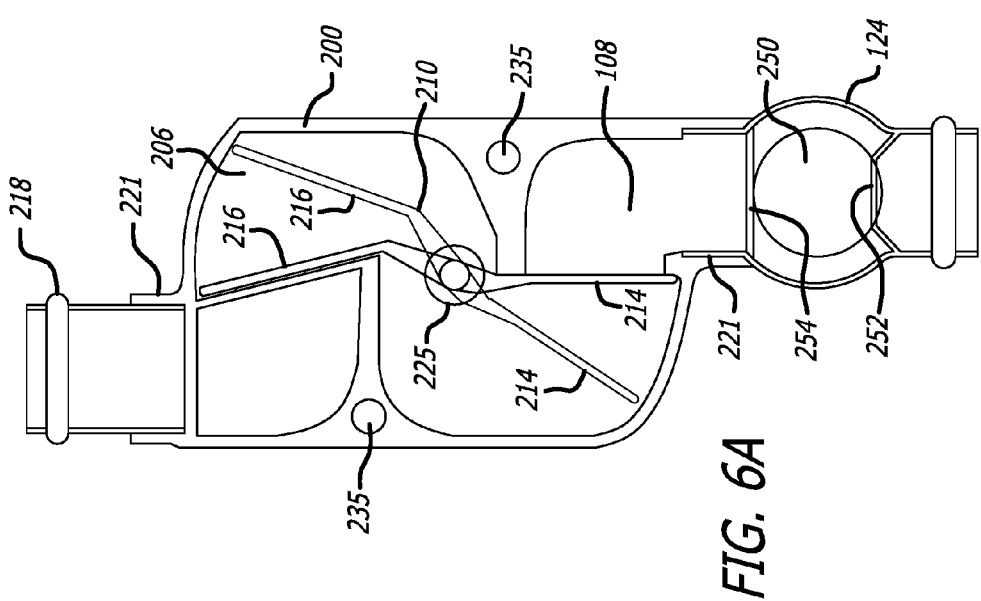
FIG. 6a is a first cross sectional view of another alternate embodiment of the valve.

FIGS. 6a and 6b illustrate another variation of the valve 46 of the present invention with a reduced valve body 200 housing a cranked paddle 210. The paddle 210 includes an offset upper flap, wherein the upper flap is angled with respect to a radius passing through its pivot point 225. The paddle further comprises at least one, and preferably a plurality of fluid transfer apertures 220 on each side of the spindle 225 to allow unrestricted fluid flow through the transfer chamber 206. The hose connections on this configuration use spigot-like connections 218 on the main body 221, although other types of connections are available as well. The lower outlet flap 214 may also be fitted with a secondary reverse flow poppet valve 150 as shown in FIG. 4. However, the backflow surge will pass easily through the fluid transfer apertures 220 although it cannot progress beyond the inlet flap 216 where increased pressure will increase the sealing capability. Also, the through mounting hole 235 is shown on either side of the valve body. The primary anti-backflow protection is provided by a captive ball float anti-backflow device 250. This variation has the advantage of simplicity and reliability, since there is a reduced opportunity for becoming jammed or seizing. The ball float device 250, which benefits from a weight reduction, rests on a support ring 252 and seals against a wide seat 254 within a bell chamber 124 that allows flow around the sides of the ball 250. In normal operation, the ball 250 rests on its support ring 252, remaining static as a result of the vacuum (suction) at the waste water hose outlet connection. In the event of a loss of vacuum and a backflow surge, the ball 250 is forced against its seat 254 thereby preventing water from entering the outlet chamber 108 of the valve. As with the previously discussed examples, a secondary reverse flow poppet valve may be fitted to the outlet flap.

Figure 8:
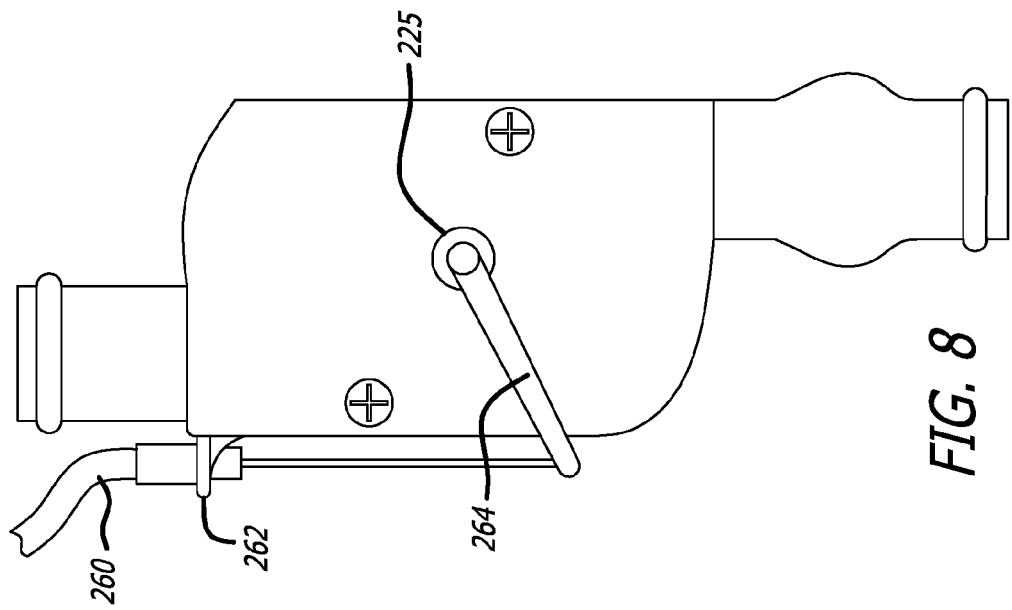
FIG. 8 is a schematic diagram of an air stop valve with a front mounted manual release cable.
Figure 7:
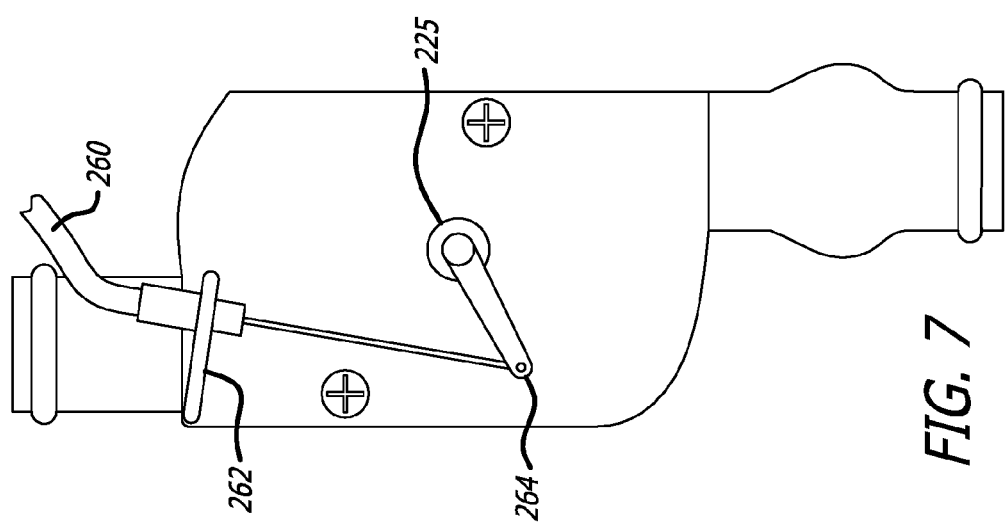
FIG. 7 is a schematic diagram of an air stop valve with a manual release cable.

FIG. 7 illustrates a version of a manual release mechanism attached to the paddle spindle 225 of the valve. The release mechanism comprises a cable 260, a cable mounting 262, an actuating lever 264, and spindle boss 252. In this design, the mechanism is mounted on the front face of the valve. If the valve fails to operate automatically for any reason, the manual release mechanism may be operated manually by pulling the emergency release control which is integrated into the water distribution/filter block 16 located in the service area at the top of the galley. FIG. 8 illustrates a second version of a manual release mechanism attached to the paddle spindle 225 of the valve, mounted on the side of the valve. The side mounting reduces the physical depth that the valve needs to occupy. If the valve fails to operate automatically, it can be released as set forth above in Example 5.

The present invention has many benefits over the prior art. Namely, the depth foot print of the valve of the present invention is significantly reduced as compared with traditional valves, allowing installation in confined spaces. The valve of the present invention also operates on a completely different principal to existing devices, by using a rotating paddle design, while maintaining the functional requirement required by the aircraft manufacturers. This ensures that the valve inhibits water backflow by a combination of the flaps, paddle and paddle pivot point design. Further, the valve may be fitted with primary and secondary mechanical anti-backflow devices, or a simple ball float valve, or a combination of such, as required. In a preferred embodiment, the primary poppet anti-backflow device is float assisted, with the resulting oscillation caused during drain down of waste water keeping the valve free and less prone to sticking. The valve can be made economically, with as few as two moving parts and constructed entirely from non-metallic materials. The valve of the present invention can include up to three stages of anti-backflow protection. Finally, the valve has the flexibility of alternative locations for the emergency manual release mechanism.

It will become apparent from the foregoing descriptions that while particular forms of the invention have been illustrated and described, various modifications can be made without departing from the spirit and scope of the invention. Accordingly, it is not intended that the invention be limited, except as by the appended claims.

I claim:

1. A backflow resistant stop valve for an aircraft galley plumbing system, comprising:
   a valve body defining an inlet, an inlet chamber, a transfer chamber, an outlet chamber, and an exit;
   a first anti-backflow device at the exit;
   a pivoting paddle disposed within the valve body having an upper flap, a spindle, and a lower flap, where the upper flap seals against the inlet chamber and the lower flap seals against the outlet chamber when the paddle is rotated to a first position, and the lower flap carries a second anti-backflow device;
   wherein a negative pressure at the outlet chamber biases the valve closed until a sufficient column of water overcomes the bias.

2. A backflow resistant stop valve for an aircraft galley plumbing system, comprising:
   a valve body defining an inlet, an inlet chamber, a transfer chamber, an outlet chamber, and an exit:
   a first anti-backflow device at the exit;
   a pivoting paddle disposed within the valve body having an upper flap, a spindle, and a lower flap, where the upper flap seals against the inlet chamber and the lower flap seals against the outlet chamber when the paddle is rotated to a first position, and the paddle has the upper flap comprising a trapezoidal shape that allows water to pass on either side, and the lower flap carries a second anti-backflow device;
   wherein a negative pressure at the outlet chamber biases the valve closed until a sufficient column of water overcomes the bias.

3. The valve of claim 1, wherein a pivot point of the paddle is offset from the upper flap.

4. The valve of claim 1, wherein the first anti-backflow device is a poppet.

5. The valve of claim 1, wherein the first anti-backflow device is a ball float.

6. The valve of claim 1, further comprising a bell chamber at the exit.

7. The valve of claim 1, wherein the upper flap is angled with respect to a radius passing through an upper flap pivot point.

8. A backflow resistant stop valve for an aircraft galley plumbing system, comprising:
   a valve body defining an inlet, an inlet chamber, a transfer chamber, an outlet chamber, and an exit;
   a first anti-backflow device at the exit;
   a pivoting paddle disposed within the valve body having an upper flap, a spindle, and a lower flap, where the upper flap seals against the inlet chamber and the lower flap seals against the outlet chamber when the paddle is rotated to a first position, and the lower flap carries a second anti-backflow device; and a manual release mechanism including a cable, a mounting bracket, and a lever coupled to the paddle for rotating the paddle using the cable;

wherein a negative pressure at the outlet chamber biases the valve closed until a sufficient column of water overcomes the bias.

9. The valve of claim 8, wherein the cable is mounted to a side of the valve body.

10. The valve of claim 8, wherein the cable is mounted to a front of the valve body.

\* \* \* \* \*